(12) United States Patent
Armstrong

(10) Patent No.: US 6,618,817 B1
(45) Date of Patent: Sep. 9, 2003

(54) SYSTEM AND METHOD FOR PROVIDING A FAULT TOLERANT DISTRIBUTED COMPUTING FRAMEWORK

(75) Inventor: Randall Scott Armstrong, Richmond (CA)

(73) Assignee: Intrinsyc Software, Inc. (CA)

( * ) Notice: Subject to any disclaimer, the term of this patent is extended or adjusted under 35 U.S.C. 154(b) by 0 days.

(21) Appl. No.: 09/431,295

(22) Filed: Oct. 29, 1999

(51) Int. Cl.$^7$ ................................................. G06F 11/00
(52) U.S. Cl. ............................. 714/4; 714/39; 709/310; 709/313; 709/318
(58) Field of Search .................................. 714/4, 39, 15, 714/55, 43; 709/316, 315, 313, 310, 318

(56) References Cited

U.S. PATENT DOCUMENTS

| | | | | |
|---|---|---|---|---|
| 5,640,564 A | * | 6/1997 | Hamilton et al. | ............ 709/315 |
| 6,018,805 A | * | 1/2000 | Ma et al. | ........................ 714/4 |
| 6,185,695 B1 | * | 2/2001 | Murphy et al. | ................. 714/4 |
| 6,249,821 B1 | * | 6/2001 | Agatone et al. | ............ 709/316 |
| 6,349,342 B1 | * | 2/2002 | Menges et al. | ............. 709/316 |
| 6,370,654 B1 | * | 4/2002 | Law et al. | ...................... 714/4 |
| 6,438,705 B1 | * | 8/2002 | Chao et al. | ..................... 714/4 |
| 6,513,112 B1 | * | 1/2003 | Craig et al. | ..................... 713/1 |

OTHER PUBLICATIONS

Wang et al. Reliability and Availability Issues in Distributed Component Object Model. IEEE. Sep. 11–12, 1997. Pp. 59–63.*

Microsoft Corporation. DCOM Technical Overview. Microsoft. Nov. 1996. Pp. 1–27.*

Horstmann et al. DCOM Architecture. Jul. 23, 1997. Pp. 1–44.*

Intrinsyc. deviceCOM: A functional extension of COM/DCOM for specialized distrubuted embedded Windows systems. Intrinsy Aug. 1999. Pp. 2–20.*

* cited by examiner

Primary Examiner—Robert Beausoliel
Assistant Examiner—Yolanda L Wilson
(74) Attorney, Agent, or Firm—Hall, Priddy, Myers & Vande Sande

(57) ABSTRACT

A method and system for providing a fault tolerant distributed computing framework. The fault tolerant system of the present invention provides inter-operability to applications and objects that operate in an existing distributed computing framework. The fault tolerant system includes a first layer including an application proxy operable to communicate with the applications as if the applications were communicating through the existing distributed computing framework and an object stub operable to communicate with the objects as if the objects were communicating through the existing distributed computing framework. The fault tolerant system further includes a second layer that includes a fault detection mechanism communicating through the first layer to determine whether any one of a plurality of objects has experienced a failure. The fault tolerant system further includes a fault recovery mechanism for recovering from the failure detected by the fault detection mechanism.

21 Claims, 5 Drawing Sheets

SYSTEM AND METHOD FOR PROVIDING A FAULT TOLERANT DISTRIBUTED COMPUTING FRAMEWORK

FIELD OF THE INVENTION

The present invention relates generally to distributed computing environments, and more specifically to a fault tolerant distributed computing framework in a mission critical environment.

BACKGROUND OF THE INVENTION

Today, it is quite common to have complex computer systems with multiple computers connected through one or more networks. Typically, applications are distributed among the multiple computers and communicate using one of several industry standard distributed computing frameworks. In general, a distributed computing framework provides a specification for how objects interact and communicate with each other. The communication may occur within one process, between two different processes on one computer and across the network to processes running on different computers. These frameworks allows an inter-process and a network communication layer to be completely transparent to the application developer. Therefore, application developers may easily scale applications across multiple machines with various architectures and various operating systems. The distributed computing frameworks also facilitate inter-operability between software components created by different vendors by clearly defining interfaces for the software components.

Currently, the Distributed Component Object Model (DCOM) defined by the Microsoft Corporation, of Redmond, Wash., is one of the most popular distributed computing frameworks for enterprise applications. Typically, applications using DCOM reside on personal computers (PCs). In some enterprises, however, it may be desirable to extend the distributed applications to a variety of embedded systems, such as heating, ventilating, air conditioning (HVAC) controllers, data loggers, and programmable logic controllers (PLCs).

In some situations, it may be desirable for some DCOM applications residing on personal computers to operate in a mission critical environment, such as industrial automation and building automation. However, there are problems with using existing distributed computing frameworks for embedded systems and mission critical systems. For instance, both embedded systems and mission critical systems typically need higher reliability standards than the typical PC applications. These higher reliability standards require the systems to recover from errors or faults without affecting the operation of the system as a whole and also require the system to recover from errors without the intervention of a human technician.

Prior attempts at achieving high reliability for embedded systems and mission critical systems have focused on creating proprietary software for each different type of system. While the proprietary software solutions offer some fault tolerant characteristics, the proprietary software still has a disadvantage because the proprietary software must be modified for each different system.

Therefore, given the shortcomings associated with the prior art proprietary software solutions, there is a present need for a fault tolerant distributed computing framework that provides high reliability without requiring the software for each different system to be modified.

SUMMARY OF THE INVENTION

In accordance with the present invention, a system and method are provided for providing a fault tolerant distributed computing framework that allows the system to detect failures and to gracefully recover from the failures. In addition, the present invention allows the system to inter-operate with existing applications and objects that operate in an existing distributed computing framework, such as DCOM.

The fault tolerant system of the present invention provides inter-operability to applications and objects that operate in an existing distributed computing framework. The fault tolerant system includes a first layer including an application proxy operable to communicate with the applications as if the applications were communicating through the existing distributed computing framework and an object stub operable to communicate with the objects as if the objects were communicating through the existing distributed computing framework and a second layer including a fault detection mechanism communicating through the first layer to determine whether any one of a plurality of objects has experienced a failure. The fault tolerant system further includes a fault recovery mechanism for recovering from the failure detected by the fault detection mechanism.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

The present invention is directed to a system and method for providing a fault tolerant distributed computing framework (hereinafter referred to as the "fault tolerant framework") for an embedded system or other mission critical computer system. The fault tolerant framework of the present invention provides a detection mechanism for detecting failures and a recovery mechanism for gracefully recovering from the failures. The fault tolerant framework is inter-operable with existing distributed computing frameworks, such as DCOM, and allows objects and applications created for the existing frameworks to operate transparently with the fault tolerant framework of the present invention. Therefore, the fault tolerant framework of the present invention does not need major modifications to operate on different systems.

Before discussing the present invention, a brief overview of the terminology used in describing a DCOM distributed computing framework is provided. In general, software objects (i.e. objects) are reusable pieces of software. Each object has at least one interface by which a client may access the object. The client is some piece of software code that uses the services of the object, such as an application. The services of the object are supplied through the interfaces of the object by a COM server. Typically, the client requests the services of the object by using a function or member call. A more detailed description of DCOM is provided in "Understanding ActiveX and OLE" by David Chappell, Microsoft Press 1996, the contents of which are hereby incorporated by reference. The following discussion will not describe further details of DCOM except where helpful in describing the present invention. The term application is used in the following discussion rather than the more general term client. However, one skilled in the art will appreciate that the present invention is not limited to only applications, but encompasses any piece of software code that accesses services of an object.

Figure 1:
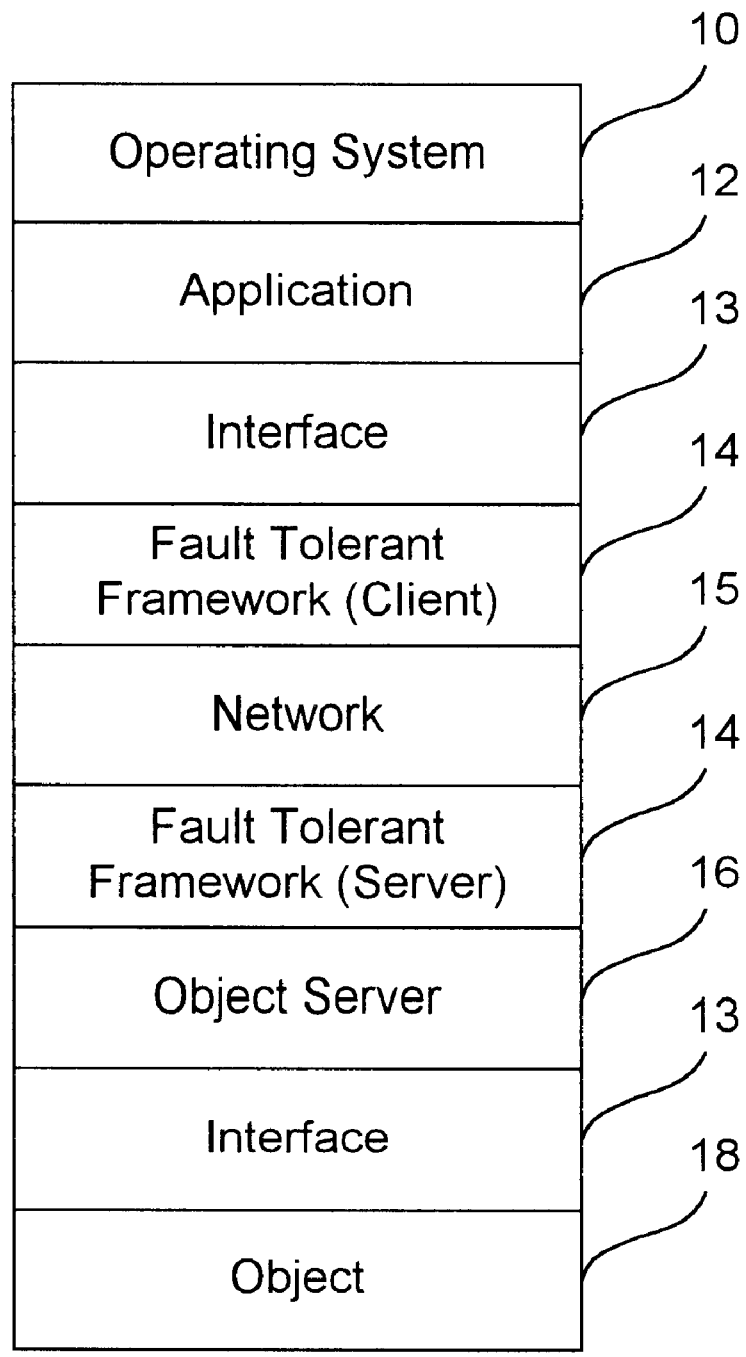
FIG. 1 is a block diagram illustrating software layers in which the fault tolerant framework is implemented.

FIG. 1 is a block diagram illustrating software layers in which the fault tolerant framework of the present invention is implemented. The software environment includes an operating system 10 for controlling the execution of applications 12 on a computer system. An exemplary operating system for embedded systems includes WINDOWS CE by Microsoft Corporation. For non-embedded systems, exemplary operating systems include WINDOW 95, WINDOWS 98, WINDOWS NT, each by Microsoft Corporation. The application 12 requests access to an object 18 through an interface 13. The object 18 is serviced by a object server 16 through the interface 13. The object server 16 communicates to the interface 13 through the fault tolerant framework 14 in a client, the fault tolerant framework 14 in a server and a network layer 15. The remaining discussion uses the term fault tolerant framework 14 to include both the fault tolerant framework in the client and in the server for ease of explanation.

In one embodiment, the fault tolerant framework 14, described later in detail, allows the applications 12 to access the objects 18 as if the distributed computing framework is DCOM. However, the present invention, in addition, provides fault tolerant mechanisms for the system.

Figure 2:
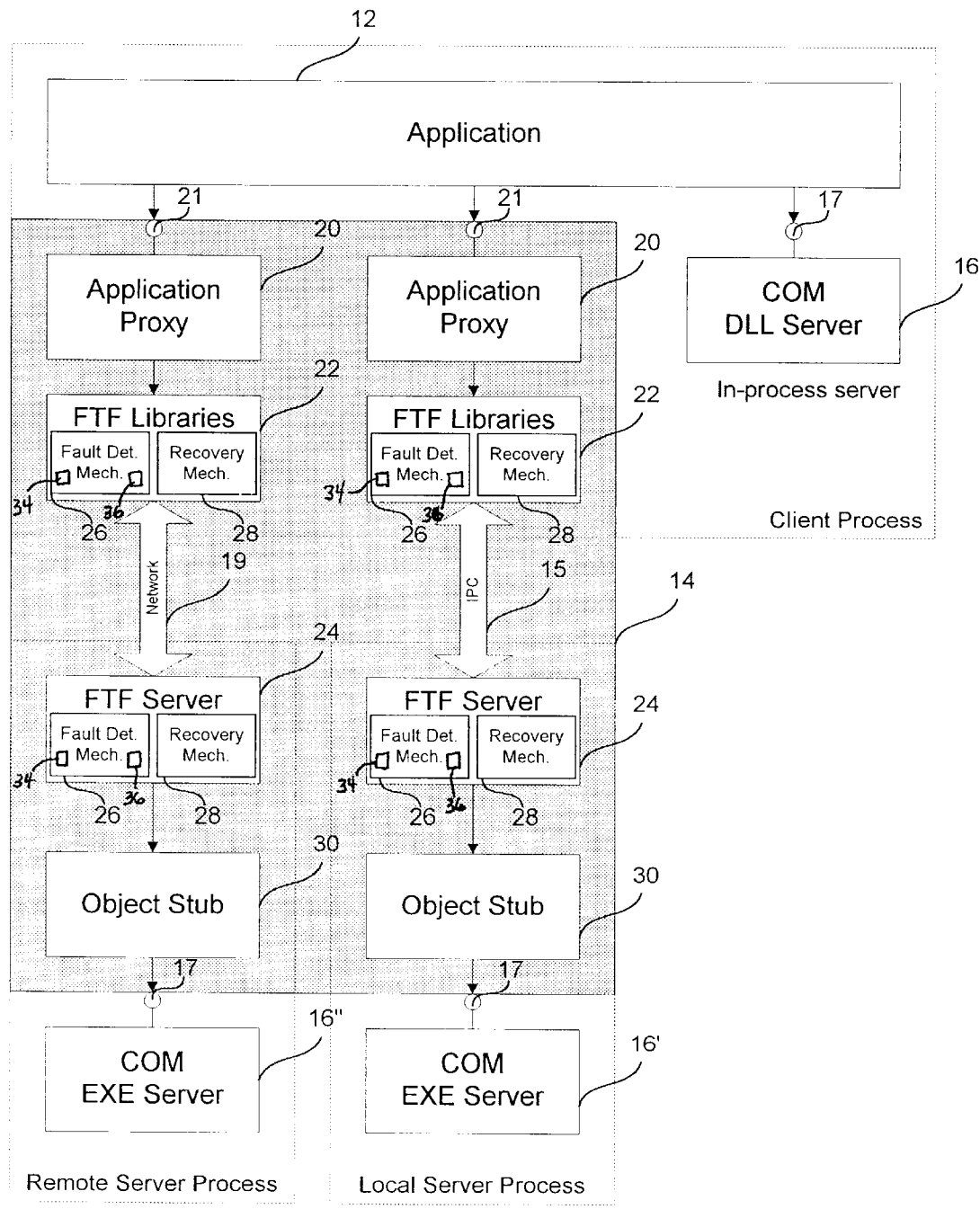
FIG. 2 is a block diagram illustrating the components of the fault tolerant framework shown in FIG. 1.

In the embodiment described below, the object server 16 is a COM server 16 and the interface is the component object module (COM) defined by Microsoft Corporation. The COM server may be an in-process server that executes in the same process as the application 12, a local out-of-process server that executes in a different process but on the same computer as the application 12, or a remote out-of-process server that resides on a remote computer accessible via a network. Briefly, FIG. 2 is a block diagram illustrating components of the fault tolerant framework 14 showing a COM server 16 in each of the above described embodiments. In the in-process server embodiment, the application 12 communicates directly with the COM server 16 through one or more interfaces 17 of the object 18 (not shown). In the local out-of-process server embodiment, the application 12 communicates with a COM server 16' through the fault tolerant framework 14 using a fault tolerant inter-process communication mechanism 15. In the remote out-of-process server embodiment, the application 12 communicates with the COM server 16" through the fault tolerant framework 14 using a fault tolerant wire protocol 19 via a network.

Referring back to FIG. 1, one skilled in the art of computer programming will appreciate that the software environment includes computer-readable instructions which may reside on one or more networked computers. Each computer includes a primary memory for storing computer-readable instructions and a processor for executing the computer-readable instructions stored in the primary memory. A system bus couples the primary memory to the processor. The computer may be an embedded device, a personal computer, a workstation or any other type of processor-based device.

As briefly mentioned before, FIG. 2 is a block diagram illustrating the components of the fault tolerant framework 14 shown in FIG. 1. The fault tolerant framework 14 includes an application proxy 20 that provides an application interface 21 to the application 12. Even though the application 12 is communicating to the application proxy 20, the application proxy 20 appears identical to the application 12 as if the application 12 were communicating directly to the object interface 17 of the in-process COM server 16. However, instead of the application 12 sending one or more function parameters directly to the COM Server 16, the application 12 sends the function parameters to the application proxy 20. The application proxy 20 formats the function parameters into a packet (not shown) and forwards the packet to an object stub 30 via either the fault tolerant wire protocol 19 or the fault tolerant inter-process communication 15. Upon receiving the packet, the object stub 30 converts the packet into the original function parameters as originally sent by the application 12.

Therefore, once the object stub 30 converts the packet, the original function parameters are in the same format used originally by the application 12. Thus, when the object stub 30 forwards the function parameters to either the local out-of-process COM server 16' or the remote out-of-process COM server 16" via the object interface 17, neither COM server 16' or 16" can distinguish whether the function parameters were sent directly from the application 12 or through the fault tolerant framework 14. The application proxy 20 and the object stub 30 of the present invention provide a mechanism that hides the standard DCE RPC wire protocol and the standard DCOM IPC wire protocol from the client application and the COM servers. Therefore, the application 12 and the object 18 communicate without modifications, even though the object 18 is accessed through the fault tolerant wire protocol 19 and the fault tolerant inter-process communication 15.

In one embodiment, the present invention generates the application proxy 20 and the object stub 30 using a compiler that reads the interface definition for the object from an Interface Definition Language (IDL) file. The IDL file is well known to people skilled in the art of distributed computing and will not be discussed in further detail. The method of generating the application proxy 20 and the object stub 30 of the present invention allows the application proxy 20 to convert an arbitrary set of function parameters into the packet that is sent according to fault tolerant wire protocol and allows the object stub 30 to reconvert the received packet into the arbitrary set of function parameters. One skilled in the art will appreciate that the actual implementation (format) for the fault tolerant wire protocol may take numerous formats without departing from the scope of the present invention. Therefore, the present invention provides inter-operability with DCOM in addition to providing the fault tolerant mechanisms for the system. The IDL file's of the present invention provide the inter-operability by separating the implementation of the object 18 from the interface 17.

In one embodiment, each application proxy 20 includes a program identifier (ProgID), a class identifier (CLSID), a remote class identifier (CLSID), a transport, a host name, and a port. The ProgID and the CLSID define an in-process COM server on the machine associated with the application. Application 12 uses the defined in-process COM server to connect to the COM Server. The ProgID may be any valid text. Typically, a host name and remote server name are encoded into the text using some convention. For applications running on the WINDOWS NT operating system, the application may change the ProgID used to create a server instance to allow the application to switch from using the fault tolerant framework to DCOM. The CLSID may be any universal unique identifier (UUID). The transport specifies the network type and the protocol that the application 12 uses for communicating with the desired COM Server. The host name and port attributes depend on the network type specified for the transport. For example, if the transport is user datagram protocol (UDP) or transmission control protocol/internet protocol (TCP/IP), the host name and port attributes are standard internet addresses. The remote CLSID is the CLSID of the COM Server on the remote machine.

As an overview, FIG. 2 also illustrates the fault tolerant mechanisms provided by a fault tolerant framework library 22 and a fault tolerant framework server 24. The fault tolerant framework library 22 executes in the same process as the application 12 (hereinafter referred to as the "client"). The fault tolerant framework server 24 (hereinafter referred to as the "server") interacts with the fault tolerant library to provide a fault detection mechanism 26 and a recovery mechanism 28. The fault detection mechanism 26 includes a time-out mechanism 34 for determining whether a request from the application 12 has received a reply from the object 18 within a configurable period of time. In general, the time-out mechanism allows the behavior of the application 12 to be more predictable. In another embodiment, the fault detection mechanism 26 further includes a pinging mechanism 36 for determining whether one of the computers or one of the processes have failed. The recovery mechanism 28, described in detail below, allows the system to recover from any of the errors detected by the fault detection mechanism 26 without affecting the operation of the system as a whole and without requiring intervention of a human technician.

Figure 3:
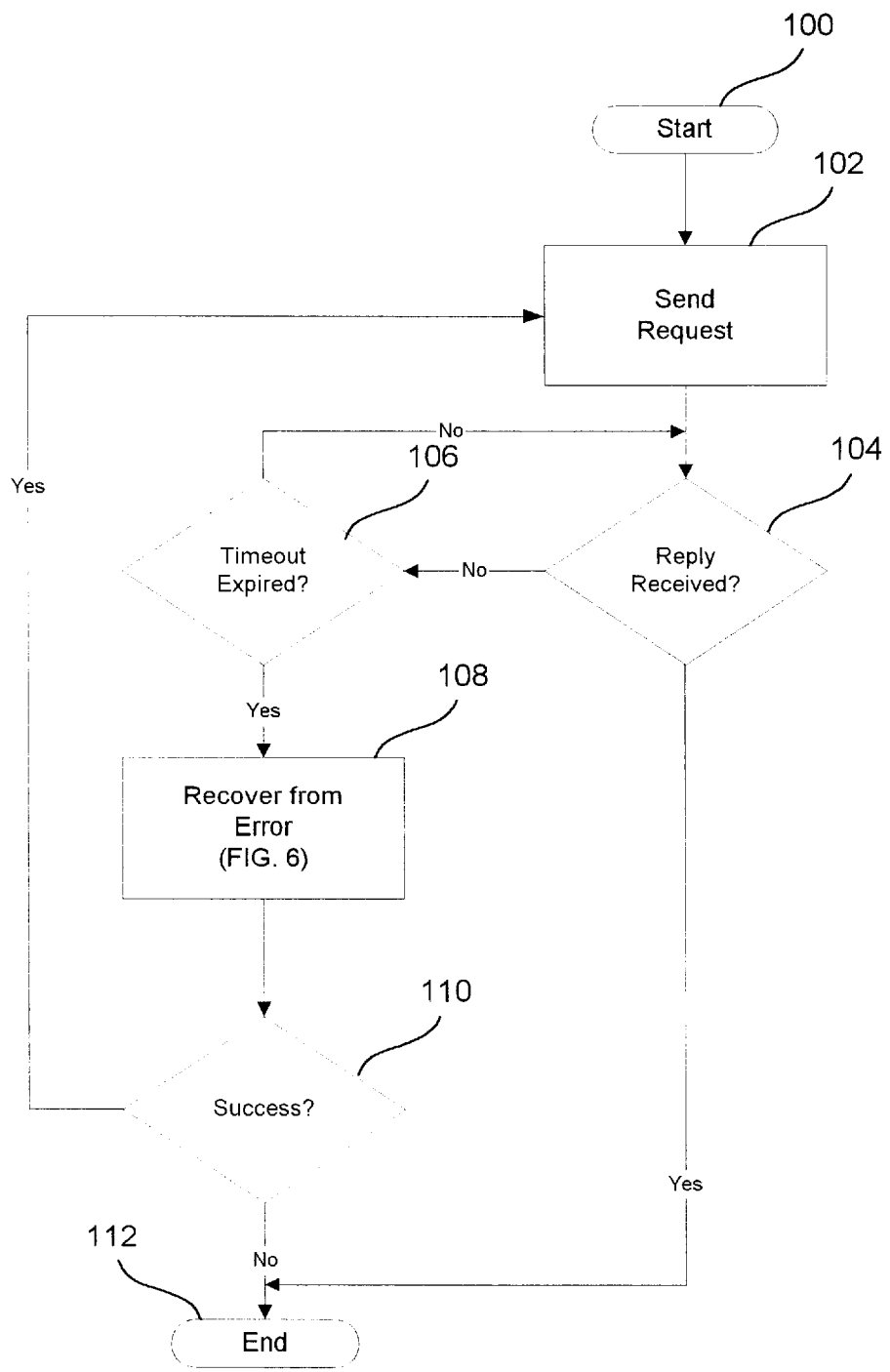
FIG. 3 is a flow diagram illustrating the processing for a time-out mechanism of the fault detection mechanism shown in FIG. 2.

FIG. 3 is a flow diagram illustrating the processing for a time-out mechanism included in the fault detection mechanism 26 shown in FIG. 2. By using the time-out mechanism 34, the client may control a time-out period by specifying an upper bound on a number of processing halts to occur while waiting for the reply from the server. The time-out period applies whenever the client initially connects to the server or at any time when the client calls a method on the server. Therefore, typically, the client has several time-out periods processing at any one time. The client may specify the time-out period by calling an application programming interface (API) or by using a registry. This time-out mechanism 34 allows the application 12 to behave more predictably and allows the present invention to configure time-outs at the object level. While it is known to perform pinging between different computers on a network, the present invention provides a pinging mechanism between objects in a distributed computing framework. Therefore, using the fault detection mechanism and the recovery mechanism of the present invention, an application is not affected when one or more objects experience a failure for unknown reasons. The present invention achieves this without using proprietary software at the application layer.

The processing for the time-out mechanism 34 begins at a start block 100 and proceeds to a block 102 where a client sends a request to the fault tolerant framework requesting access to an object 18 shown in FIG. 1. The request is typically a call to a member function of the object. In one embodiment, the request includes specifying a time-out period for the request. After sending the request, the client determines whether the reply has been received at a decision block 104. If the reply has been received, processing completes at an end block 112. However, if the reply has not been received at decision block 104, the client determines whether the time-out period has expired at a decision block 106. If the time-out period has not yet expired, processing loops back to decision block 104 where processing continues as described above. However, if the time-out period has expired, processing proceeds to a block 108 where the fault tolerant framework attempts to recover from the time-out error.

Briefly, the processing for recovering from the time-out error, which will be described in detail with reference to FIG. 7, will return a status indicating whether the recovery was successful or not. If the recovery is successful, processing loops back to block 102 so that the client can re-send the request that timed-out. Processing then continues from block 102 as described above. If the recovery is not successful, the processing proceeds to end block 112. As mentioned earlier, the fault tolerant framework allows the time-out period for different fault tolerant framework servers 24 to be different. This allows the client the ability to fine-tune the system.

Figure 4:
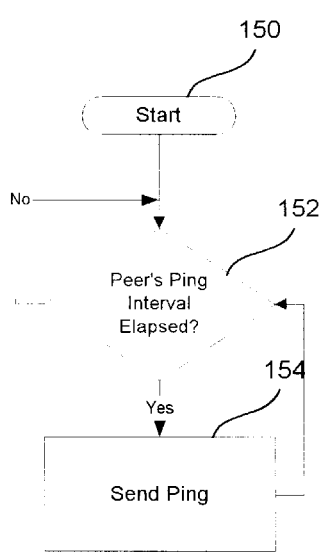
FIG. 4 is a flow diagram illustrating the processing for a ping mechanism of the fault detection mechanism shown in FIG. 2 in which the ping mechanism determines when to send a ping.
Figure 5:
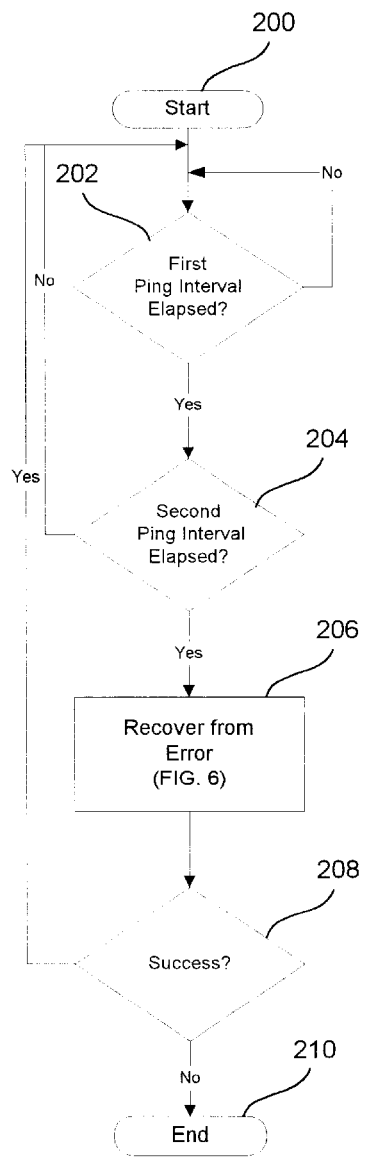
FIG. 5 is a flow diagram illustrating further processing for the ping mechanism of the fault detection mechanism shown in FIG. 2 in which the ping mechanism detects a ping time-out interval.

FIG. 5, in conjunction with FIG. 4, illustrate the processing for the ping mechanism shown in FIG. 2. In general, the ping mechanism of the fault detection mechanism 26 allows the system to detect when either the client or the server fails to send pings. The failure to send pings indicates some type of error. Using this loss of ping, the system then determines when to generate an error or when to attempt recovery. In general, the ping mechanism provides a periodic heartbeat or "ping" between the client and the server. If either the client or the server stops receiving the ping, the one that is no longer receiving the ping determines that the other has failed in some manner. The ping mechanism then activates the recovery mechanism shown in FIG. 6.

First, FIG. 4 is a flow diagram illustrating processing for the ping mechanism of the fault detection mechanism 26 shown in FIG. 2 in which the ping mechanism determines when to send a ping. The same flow diagram is used to illustrate the processing for both the client and the server. The following discussion is based on the processing with respect to the client. The ping mechanism 36 for sending pings begins at a start block 150 and proceeds to a decision block 152 where the client determines whether the ping-interval for a peer has elapsed. The peer may be a server or an object. If not, processing loops back to decision block 152 until the ping-interval has elapsed. Processing then proceeds to block 154 where the client sends the ping. As mentioned earlier, when the client connects to the server, the ping interval for both is activated. Therefore, the client continues the above process until the connection between the client and the server is closed.

Now, FIG. 5 is a flow diagram illustrating further processing for the ping mechanism of the fault detection mechanism shown in FIG. 2 in which the ping mechanism detects an error based on a ping time-out interval. Again, the same flow diagram is used to illustrate the processing for both the client and the server. The following discussion describes the processing with respect to the client. In general, the ping mechanism is performed for each process.

When the ping mechanism detects an error for one process, each object servicing the process with the detected error must recovery gracefully. The recovery mechanism will be described later with reference to FIG. 6. The ping mechanism for detecting errors begins at a block 200 and proceeds to a decision block 202 where the client determines whether a first ping interval has elapsed for the server. If not, processing loops back to decision block 202 until the first ping interval has elapsed. Once the first ping interval has elapsed, the processing proceeds to decision block 204 where the client determines whether a second ping interval has elapsed. If so, processing proceeds to a block 206 where the fault tolerant framework recovers from the error. The processing in block 206 will be described in detail later. If the second ping interval has not elapsed, the processing loops back to decision block 202 and processing continues as described above. Returning to block 206, if the system recovers successfully as determined at decision block 208, processing loops back to block 202 and processing continues as described above. If not, processing proceeds to an end block 210 where processing completes.

Figure 6:
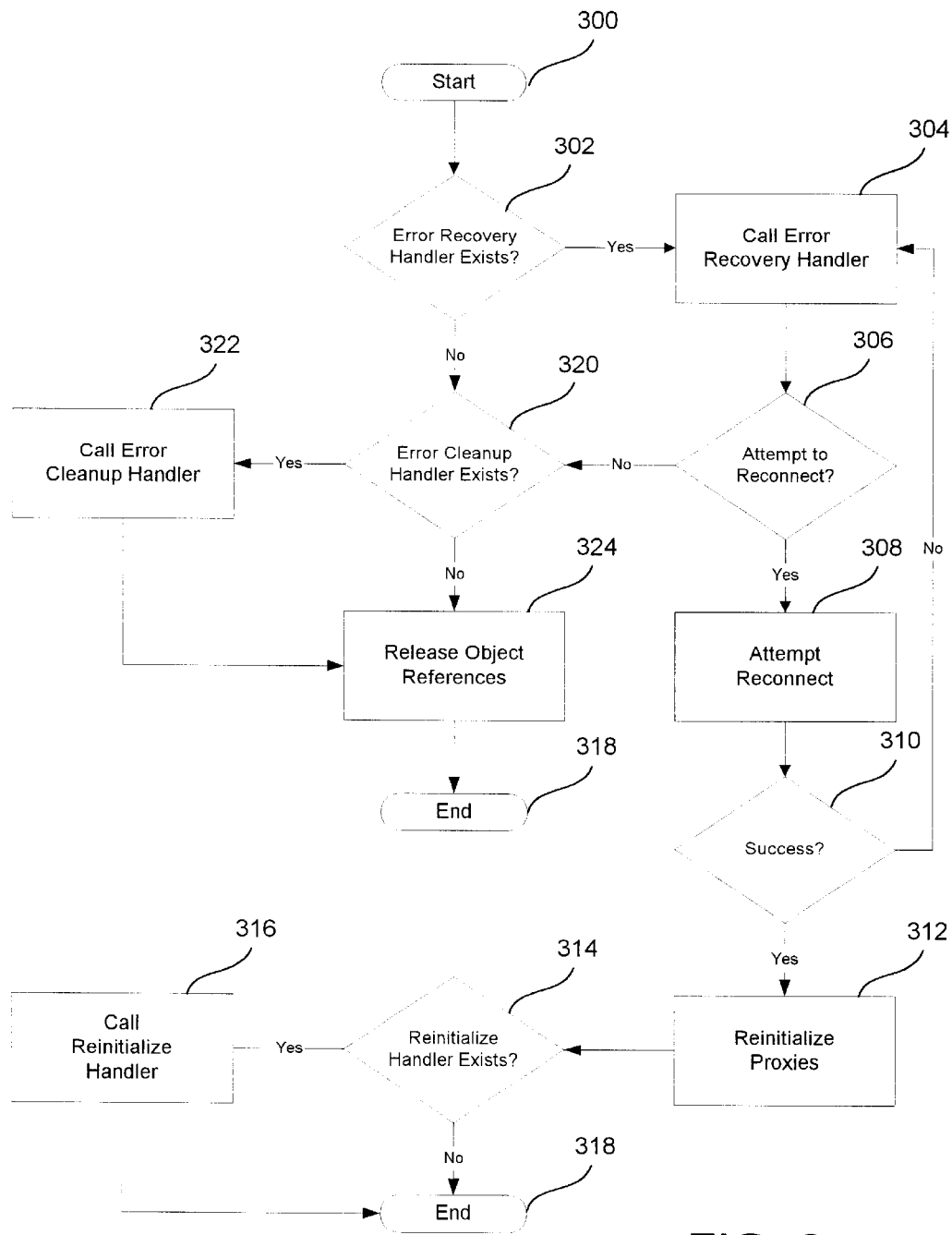
FIG. 6 is a flow diagram illustrating the processing for the recovery mechanism shown in FIG. 2.

FIG. 6 is a flow diagram illustrating the processing for the recovery mechanism shown in FIG. 2. The recovery mechanism is activated whenever the ping mechanism 36 detects a connection failure and whenever the time-out mechanism 34 detects a time-out for a method call or connection to the server. The processing begins at a start block 300 and proceeds to decision block 302 where a determination is made whether an error recovery handler exists. In general, the error recovery handler is a piece of code executed whenever error recovery is activated. In one embodiment, the error recovery handler identifies the type of error and performs specific actions based on that type of error. If the error recovery handler does not exist, processing proceeds to a decision block 320 where a decision is made whether an error clean-up handler exists. If the error clean-up handler does not exist, processing proceeds to block 324 where object references are released. Processing then proceeds to an end block 318. The release of object references is performed using techniques well known to those skilled in the art of computer programming. If the error cleanup handler exists at decision block 320, the processing proceeds to block 322 where the fault tolerant framework calls the error cleanup handler. After the error cleanup handler completes, the processing proceeds to block 324 where object references are released. Processing then ends at end block 318.

Returning to decision block 302, if the fault tolerant framework determines that the error recovery handler exists, the processing proceeds to block 304 where the error recovery handler is called. In general, the error recovery handler may be a default handler or a handler specific to the application. The skills for adding handlers specific to an application are well known within the art of computer programming. The error recovery handler determines whether the fault tolerant framework should attempt to reconnect to a server at decision block 306. If the reconnect attempt fails, processing proceeds to decision block 320 where processing continues as described above. Otherwise, the error recovery handler proceeds to block 308 where the fault tolerant framework attempt to reconnect to a specified server. The specified server may include the server that caused the error or may be any other server in the network. The processing proceeds to decision block 310 where a determination is made whether the reconnect attempt was successful. If not, processing loops back to block 304 to call the error recovery handler and processing continues as described above.

At decision block 310, if the reconnect is successful, processing proceeds to reinitialize the application proxies at a block 312. Reinitializing the proxies may include making a method call to a new server object to place the server into the same state as the server that failed. In this way, the client application may be unaware that the server had failed. Processing then proceeds to decision block 314 where a decision is made whether a reinitialize handler exists. If so, processing proceeds to block 316 where the fault tolerant framework calls the reinitialize handler. Again, the reinitialize handler may be a default handler or a handler designed for a specific application. The processing completes at end block 318 when a reinitialize handler does not exist or when the reinitialize handler has been called.

The fault tolerant framework discussed above is based on the DCOM distributed computing framework. However, the present invention is applicable to any distributed computing framework, such as CORBA and Java RMI. The discussion based on the DCOM distributed computing framework can be readily adapted to these other frameworks by one skilled in the art of distributed computing.

While the preferred embodiment of the invention has been illustrated and described, it will be appreciated that various changes can be made therein without departing from the spirit and scope of the invention.

The embodiments of the invention in which an exclusive property or privilege is claimed are defined as follows:

1. A fault tolerant architecture that provides interoperability to a plurality of applications and a plurality of objects operable in an existing distributed computing framework on a plurality of networked computers, the fault tolerant architecture comprising:

a first layer comprising an application proxy operable to communicate with the plurality of applications as if the applications were communicating through the existing distributed computing framework and an object stub operable to communicate with the plurality of objects as if the objects were communicating through the existing distributed computing framework;

a second layer comprising a fault detection mechanism that communicates through the first layer to determine when at least one of the plurality of objects has experienced a failure; and said fault detection mechanism comprising a time-out mechanism for determining when any of the applications requesting services from any of the objects fails to receive a reply from the object to which services were requested within a pre-determined period of time, said pre-determined period of time being configurable by any of the plurality of applications.

2. The fault tolerant architecture of claim 1, wherein the fault detection mechanism further comprises a ping mechanism that sends a ping on a ping interval between one of the plurality of applications and an associated object and determines whether the ping is detected within the ping interval.

3. The fault tolerant architecture of claim 2, further comprising a fault recovery mechanism for recovering when the ping mechanism fails to detect the ping within the ping interval.

4. The fault tolerant architecture of claim 3, wherein the fault recovery mechanism places a server in a state that the application is unaware of the failure, the server being responsible for handling the requests of services from the associated object.

5. The fault tolerant architecture of claim 4, wherein the existing distributed computing framework is a distributed component object model (DCOM) framework.

6. The fault tolerant architecture of claim 1, further comprising a fault recovery mechanism for recovering from failure detected by the fault detection mechanism.

7. The fault tolerant architecture of claim 1, wherein the existing distributed computing framework is a distributed component object model (DCOM) framework.

8. The fault tolerant architecture of claim 1, wherein the existing distributed computing framework is a distributed component object model (DCOM) framework.

9. A method for providing fault tolerance between a plurality of applications and a plurality of objects operable in an existing distributed computing framework on a plurality of interconnected computers, the method comprising:

providing a first layer operable to communicate with the plurality of applications as if the applications were communicating through the existing distributed computing framework and operable to communicate with the plurality of objects as if the objects were communicating through the existing distributed computing framework; and providing a fault detection mechanism operable to communicate through the first layer to determine when at least one of the plurality of objects has experienced a failure, said fault detection mechanism comprising determining when any of the applications requesting services from any of the objects fails to receive a reply from the object to which services were requested within a pre-determined period of time; and configuring the pre-determined period of time through one of the plurality of applications.

10. The method of claim 11, wherein the existing distributed computing framework is a distributed component object module (DCOM) framework.

11. The method of claim 10, further comprising recovering from the failure while maintaining operability between the object experiencing the failure and its associated application.

12. A computer-readable medium containing instructions which, when executed by a computer, perform a method for providing fault tolerance between a plurality of applications and a plurality of objects operable in an existing distributed computing framework on a plurality of interconnected computers, the method comprising:

communicating between the plurality of applications and the plurality of objects through a first layer as if the plurality of applications and the plurality of objects were communicating through the existing distributed computing framework; and detecting a failure of any of the plurality of objects by determining when any of the applications requesting services from any of the objects fails to receive a reply from the object to which services were requested within a pre-determined period of time; and configuring the pre-determined period of time through one of the plurality of applications.

13. The computer-readable medium of claim 12, further comprising recovering from the failure while maintaining operability between the object experiencing the failure and its associated application.

14. The computer-readable medium of claim 13, wherein the existing distributed computing framework is a distributed component object model (DCOM) framework.

15. The computer-readable medium of claim 12, wherein the existing distributed computing framework is a distributed component object model (DCOM) framework.

16. A method for providing inter-operability to an application and an object in an existing distributed computing framework on a plurality of networked computers, comprising:

formatting a function parameter received from the application for communication to an object stub, thereby creating a formatted packet;

converting the formatted packet into a secondary function parameter for communication to a COM server such that the COM server cannot determine the source of the secondary function parameter.

17. The method of claim 16, wherein the format of the secondary function parameter is such that the COM server cannot determine a source protocol.

18. The method of claim 16, wherein the formatted function parameter is communicated to the object stub via a fault tolerant wire protocol.

19. The method of claim 16, wherein the formatted function parameter is communicated to the object stub via a fault tolerant inter-process communication.

20. The method of claim 16, further comprising applying a system time-out to halt at least one process at the object level.

21. The method of claim 20, wherein the application of the time-out comprises:

at the client, requesting access to an object;

at the client, determining the receipt of a reply from the object;

determining if a time-out period has expired, if the client does not receive the reply; and recovering from a time-out error if the time-out period expires.

\* \* \* \* \*

UNITED STATES PATENT AND TRADEMARK OFFICE
CERTIFICATE OF CORRECTION

PATENT NO. : 6,618,817 B1  Page 1 of 1
DATED : September 9, 2003
INVENTOR(S) : Armstrong It is certified that error appears in the above-identified patent and that said Letters Patent is hereby corrected as shown below:

Column 9,
Line 4, delete "1", and insert -- 6 --.
Line 20, delete "and".
Line 32, delete "11", and insert -- 9 --.
Line 49, delete "and".

Signed and Sealed this

Thirteenth Day of January, 2004

JON W. DUDAS
*Acting Director of the United States Patent and Trademark Office*